(12) United States Patent
Shoemaker et al.

(10) Patent No.: US 7,117,735 B2
(45) Date of Patent: Oct. 10, 2006

(54) FLUID FLOW DIRECTION AND VELOCITY SENSOR

(76) Inventors: Kevin Owen Shoemaker, 780 Applewood Dr., Lafayette, CO (US) 80026; Jason Bryan Coder, 3460 E. 128th Pl., Thornton, CO (US) 80241-2149

( * ) Notice: Subject to any disclaimer, the term of this patent is extended or adjusted under 35 U.S.C. 154(b) by 0 days.

(21) Appl. No.: 10/879,974

(22) Filed: Jun. 29, 2004

(65) Prior Publication Data

US 2005/0022592 A1    Feb. 3, 2005

Related U.S. Application Data

(60) Provisional application No. 60/483,644, filed on Jun. 30, 2003.

(51) Int. Cl.
*G01W 1/00* (2006.01)
(52) U.S. Cl. .................... 73/170.01; 73/170.11
(58) Field of Classification Search ............. 71/170.15, 71/170.11, 170.01
See application file for complete search history.

(56) References Cited

U.S. PATENT DOCUMENTS

| 4,011,756 A | 3/1977 | Lemos |
| 4,078,426 A | 3/1978 | Casani |
| 4,320,666 A | 3/1982 | Redding |
| 4,331,037 A | 5/1982 | Du Vall |
| 4,487,063 A | 12/1984 | Hopper |
| 4,631,958 A | 12/1986 | Van Cauwenberghe |
| 4,631,959 A | 12/1986 | Motycka |
| 5,117,687 A | 6/1992 | Gerardi |
| H1688 H | 11/1997 | Lake |
| 6,370,949 B1 | 4/2002 | Zysko |

*Primary Examiner*—Edward Lefkowitz
*Assistant Examiner*—Andre Allen

(57) ABSTRACT

A deflection detection system and software. The apparatus includes a system of one or more deflection sensors (18(*a*)(*b*)) connected to a pliable rod or other structure. The sensors measure movement due to a fluid impinging on the deflection cylinder (12) and transfers the measurements to a small computer (24). The computer analyzes the sensor measurements and computes a value for fluid speed and direction. The software compensates for various inherent oscillations to improve accuracy over current fluid flow sensors. The device is constructed of low cost materials.

2 Claims, 5 Drawing Sheets

FLUID FLOW DIRECTION AND VELOCITY SENSOR

CROSS-REFERENCE TO RELATED APPLICATIONS

This application is entitled to the benefit of Provisional Application Ser. No. 60/483,644 filed 2003 Jun. 30.

FEDERALLY SPONSORED RESEARCH

Not Applicable

SEQUENCE LISTING

Not Applicable

BACKGROUND OF THE INVENTION

1. Field of Invention

This invention relates to fluid flow sensing devices, specifically to such devices in which the fluid is measured by the deflection or movement of an object.

2. Background of the Invention

This invention relates to wind and fluid flow sensors, both direction and velocity. The wind sensors come in several basic forms including cup and vane, sonic anemometer, hot wire anemometer and diode type anemometer.

The cup and vane anemometers (U.S. Pat. No. 4,078,426, Casani, March 1978) are by far the most prevalent and can be seen at most airports, atmospheric weather stations and at other agencies interested in measuring wind speed and direction. The cup refers to (typically) three cups spread over 120 degree angles on a horizontal plane. The cups are attached to radially positioned rods that attach to the cup at one end and to a central hub on the other end. The center of the hub is designed in such a way as to allow smooth rotational movement along the vertical axis. In this way the cups will respond to air movement in the horizontal plane. A speed sensor or tachometer is attached to the hub in such a way as to measure to amount of rotation over a specified amount of time. This rotational movement relates to the speed of the impinging air currents and thus to wind speed. One of the drawbacks of this type of anemometer is that the inertia of the mechanical mechanism must be overcome before meaningful measurements can be made. Also, this style of anemometer is not conducive to measuring gusts, again because of the inertia. The Vane refers to an arrow like device that is attached at its center of gravity to a rotational sensor to measure angular deflection from (typically) North. In this way a measurement of the direction of the impinging wind currents can be measured and therefore the wind direction can be determined. A drawback of this type of wind sensor is found in the overshoot and oscillations that occur during changes in wind direction. Also, these sensors display a wind direction even when the wind is not blowing.

Sonic anemometers are a class of instruments that are typically used by research and other scientific concerns. These systems use the changes in the speed of sound as measured over a finite path by (typically) ultrasonic transducers (U.S. Pat. No. 4,320,666, Redding, March/1982). These systems require computers and sophisticated software to measure the speed of sound over several pathways to determine wind velocity and direction. These instruments overcome the failings of the more prevalent cup and vane systems but cost considerably more to purchase and maintain. Also, the vortices shed by the physical structures necessary to hold the transducers rigidly in place cause uncertainties in the measurements.

Hot wire anemometers (U.S. Pat. No. 4,011,756, Lemos, March/1977) consist of several hot wires placed typically at 90 degree intervals in front of appropriately placed shields to measure wind velocity and direction. The amount of air moving across a wire (typically NiChrome) set to a stable temperature, will cause a change in amperage necessary to maintain that temperature proportional to the wind speed. This system uses several sensors to measure the amount of air movement from various angles and therefore interpret the wind speed and direction. These systems require a good deal of power to operate properly and are insensitive to gust conditions. The software and hardware requirements are substantial resulting in high cost for procurement as well as maintenance.

Diode type anemometers (U.S. Pat. No. 4,487,063, Hopper, December/1984) use the same principles of the hot wire systems to determine wind speed and direction. They also suffer from the same drawbacks. Their advantage is in a more robust physical construction allowing their use in aerospace applications and other high vibration venues.

Van Cauwenberghe in U.S. Pat. No. 4,631,958 (1986) uses a sphere attached to a shaft. When the "wind force" moves the shaft, electromagnetic or optical sensors detect the deflection from the neutral position. Signals from the sensors are then computed using a formula to eventually display a wind speed and direction. Also, an actuator is used in the operation of the shaft. This causes excess maintenance and raises the cost of the device.

Gerardi in U.S. Pat. No. 5,117,687 (1992) also uses a sphere attached atop a shaft. The system also uses an array of strain gauges. The excessive use of strain gauges contributes to the overall complexity of the design.

Motycka in U.S. Pat. No. 4,631,959 (1986) employs a pivotally mounted shaft with a drag element attached to the shaft. Placed on the shaft is a ferrite block. Electromagnets are mounted orthogonally on the shaft, adjacent to the ferrite block. Changes in velocity of fluid are detected by a change in voltage across the electromagnets. This voltage is then computed in a micro-processor. Since electromagnets and ferrite are placed on the pivotal shaft, complexity is added to the design and computation of the fluid velocity.

Zysko in U.S. Pat. No. 6,370,949 (2002) also uses a shaft that is to be deflected by a fluid, however, he uses two pairs of sensors to detect the movement of the shaft. This system is only practical at high fluid velocities and could not accurately detect a fluid moving at a realitivley slow speed.

Lake in U.S. Pat. No. H1,688 (1997) employs a shaft as well but uses surface protrusions mounted in a spiral pattern on the shaft to assist in deflection. This system uses four sensors to measure deflection caused by the fluid. Also, a wire mesh, with square grid is used on the surface that is to be deflected. This adds unnecessary complexity to the design.

The fluid flow and direction sensor also has applications in measuring a liquid fluid flow such as but not limited to water. If the Fluid Flow Direction and Velocity Sensor were to be completely inverted. In this situation, the deflection cylinder would be realitivley pointing down. The bottom part of the deflection cylinder would be inserted into the liquid type fluid and detections of the fluid characteristics could be made in much the same manner it would if detecting a gaseous fluid.

In conclusion, we are not aware of any other invention formerly developed in either the detection of gaseous and/or liquid fluid that has our simple design, grade of accuracy, as well as cost efficiency. All of these we have incorporated into our Fluid Flow Direction and Velocity Sensor.

OBJECTS AND ADVANTAGES

The first object is to easily detect the movement of fluid or air for the purposes of determining velocity or integrated mass. This can be accomplished with this invention by using simple displacement detecting devices and relatively simple mathematics.

The second object of the design is to make a commercial grade instrument for less cost than instruments designed to accomplish the same tasks. This design takes advantage of new plastics and enclosures that allow a relatively inexpensive device to be made that accomplishes reasonable measurements to be made.

The third object is to make a device that can be used for several applications, using only software updates to adapt to various fluid viscosities.

The advantages of this invention are:
1. Simplicity. This device is made from readily available components and does not require sophisticated computing power.
2. Low cost. The use of low cost enclosures and electrical components is emphasized.
3. Adaptability. With software upgrades the same sensing element can be used for many types of fluids or gases.

SUMMARY

It is the objective of the Fluid Flow Direction and Velocity Sensor to provide accurate fluid flow and direction measurements in a low cost manner. Another objective of the invention is to overcome some of the sources for measurement error prevalent in previous instruments.

The method to accomplish the goals of the Fluid Flow Direction and Velocity Sensor is to accurately measure the deflection of a rod or other suitable structure and therefore determine the fluid speed speed and direction necessary to create such a deflection. The deflection measurements are typically but not necessarily done in an X and Y direction. In this way a measurement of the Cartesian offset from vertical can be determined. From this determination a simple trigonometric calculation can be created that is directly proportional to the fluid speed and direction. Further, continuous measurements can add to the accuracy by integrating over time and allowing any resonance caused by mechanical construction to be filtered out. A small computer executes the mathematical functions and puts out accurate data to the end user.

DRAWINGS—FIGURES

The invention will now be described in conjunction with the attached drawings, in which.

DRAWINGS—REFERENCE NUMERALS

10 Solid and Stable Base
12 Deflection Cylinder
14 Support Legs
16 Sensor Platform
18(a)(b) Sensor(s)
19 Sensor/Cylinder Connector
20 Mounting Screws
22 Mounting Screws
24 Small Computer
26 Personal Computer
28 Liquid fluid type
30 Joystick
32 Connection to Small Computers (24)
34 Coupling

DETAILED DESCRIPTION

FIGS. 1–4—Preferred Embodiment

Figure 1:
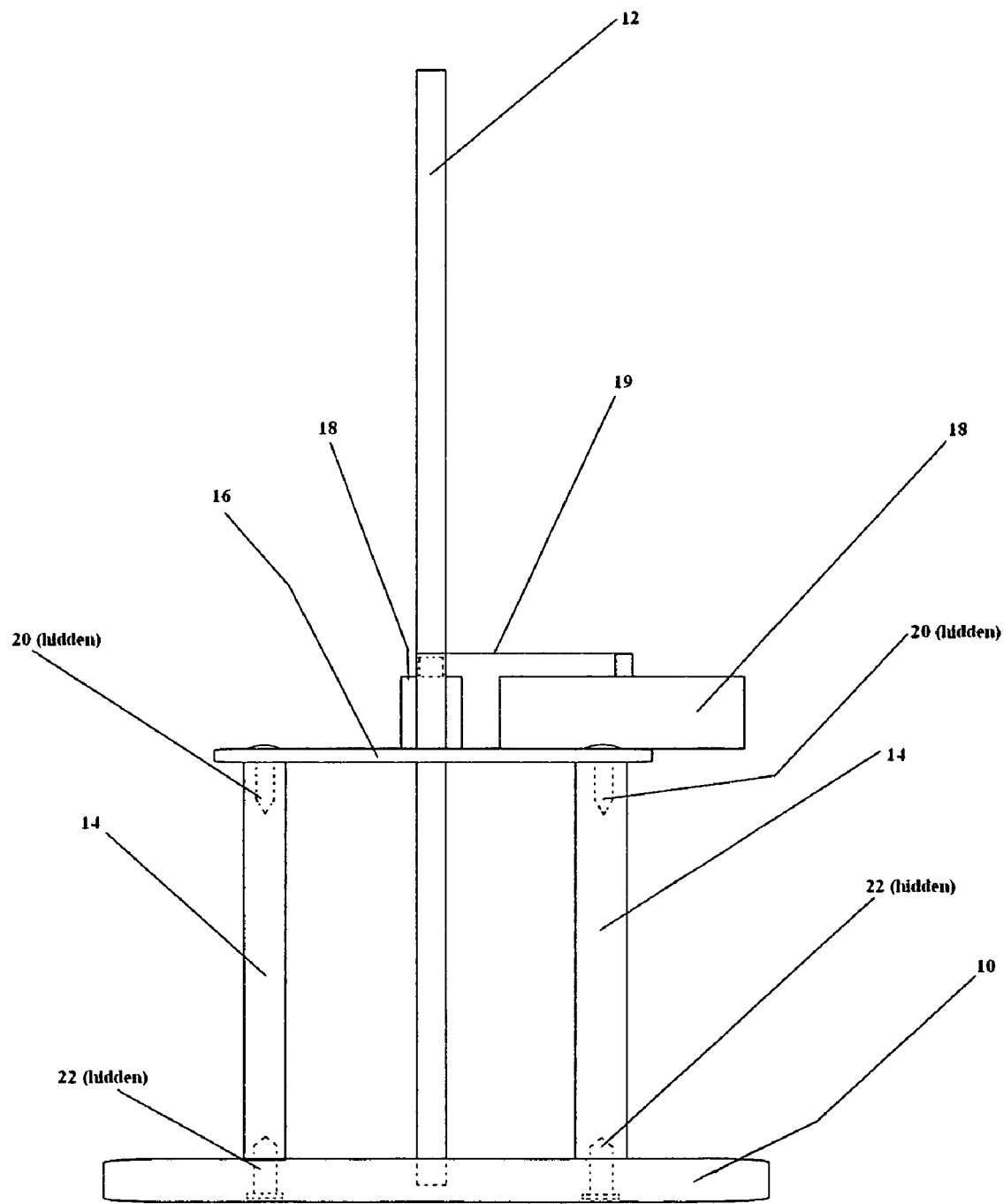
FIGS. 1 and 2 represent the overall possible appearance and possible method of construction in a front and/or side view (FIG. 1) and a top view (FIG. 2)
Figure 2:
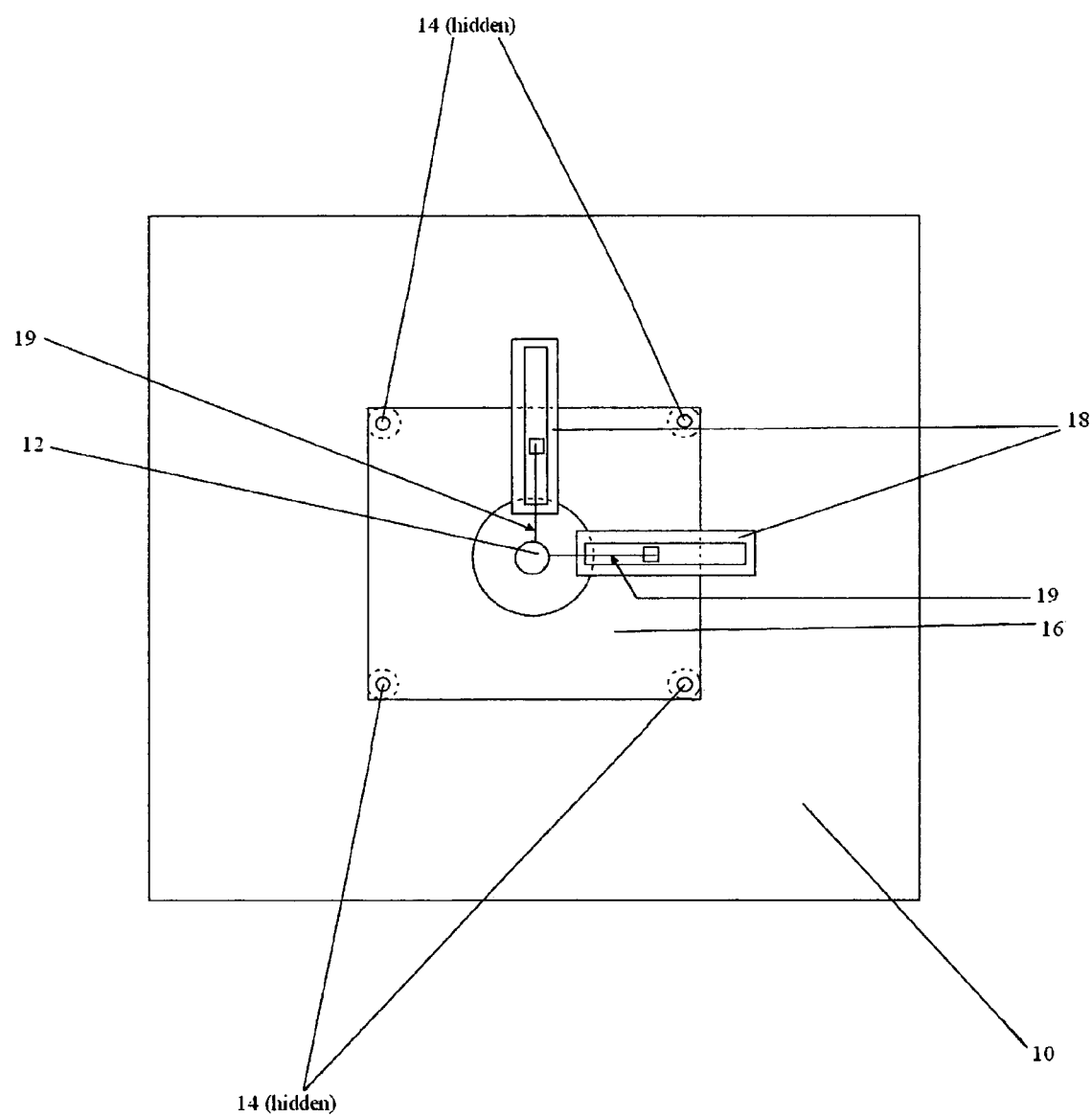

FIGS. 1 and 2:

The invention is mounted on a solid and stable base (10). Extending from the base is the deflection cylinder. The deflection cylinder (12) is mounted perpendicular to the base. The height of the deflection cylinder is not crucial and can be varied. Also extending from the base are four support legs (14) that support the sensor platform (16). The number of support legs and their angle to the base and their angle to the deflection cylinder may be varied. Atop the four support legs, the sensor platform (16) is mounted. Sensor(s) (18) are mounted on top of the sensor platform. The sensors are placed perpendicular to each other. All sensors are connected (19) to the deflection cylinder. Parts 20 and 22 are mounting screws and have no effect on the operation of the invention. Some other means for securing the support legs and sensor platform may be used. All dimensions, parts and methods exhibited are only examples selected for easier understanding.

Figure 3:
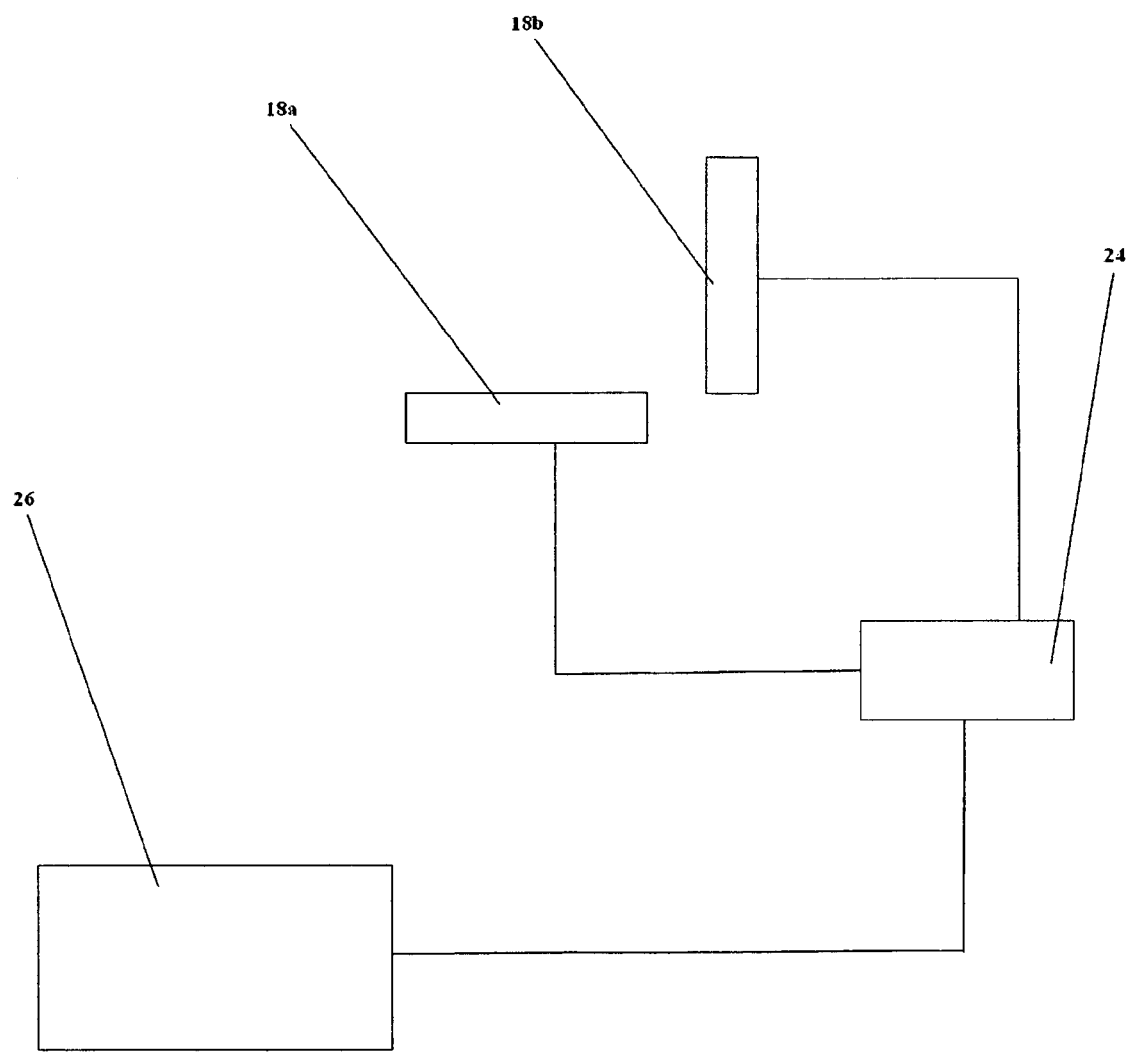
FIG. 3 represents a possible hardware configuration.

FIG. 3:

FIG. 3 shows a possible hardware configuration for the invention. The deflection sensor(s) (18) are mounted perpendicular to each other. For software purposes these each sensor represents a certain axis in the Cartesian coordinate plain. For example sensor 'a' (18a) could be referred to as the east/west axis, while sensor 'b' (18b) could be referred to as the north/south axis. Both sensors are connected to a small, possibly, single board computer (24) computes the fluid speed and direction. The output of the smaller computer is then transferred to a larger computer, possibly of the personal computer (PC) type (26). Once the fluid flow and direction data has entered the PC it is displayed graphically. Certain features of the graphic display include but are not limited to: graphs of fluid or wind speed and time, graphs of fluid direction and time, trend analysis, current fluid speed and direction, etc.

Figure 4:
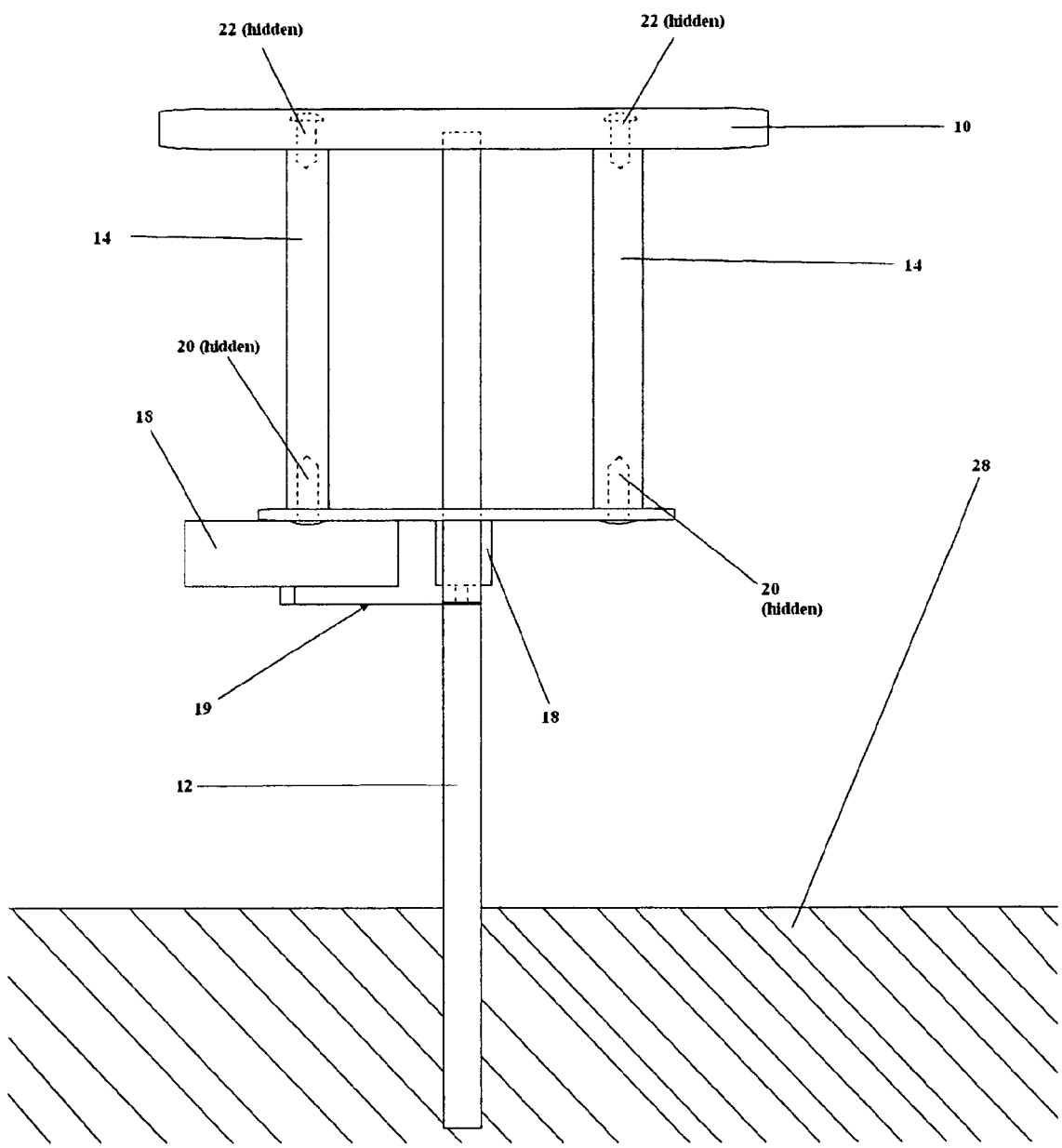
FIG. 4 represents a the preferred embodiment for detecting the characteristics of a liquid fluid flow.

FIG. 4:

FIG. 4 shows the preferred embodiment of the fluid flow direction and velocity Sensor if it were to be inverted and placed in a liquid fluid type (28) such as, but not limited to water.

Figure 5:
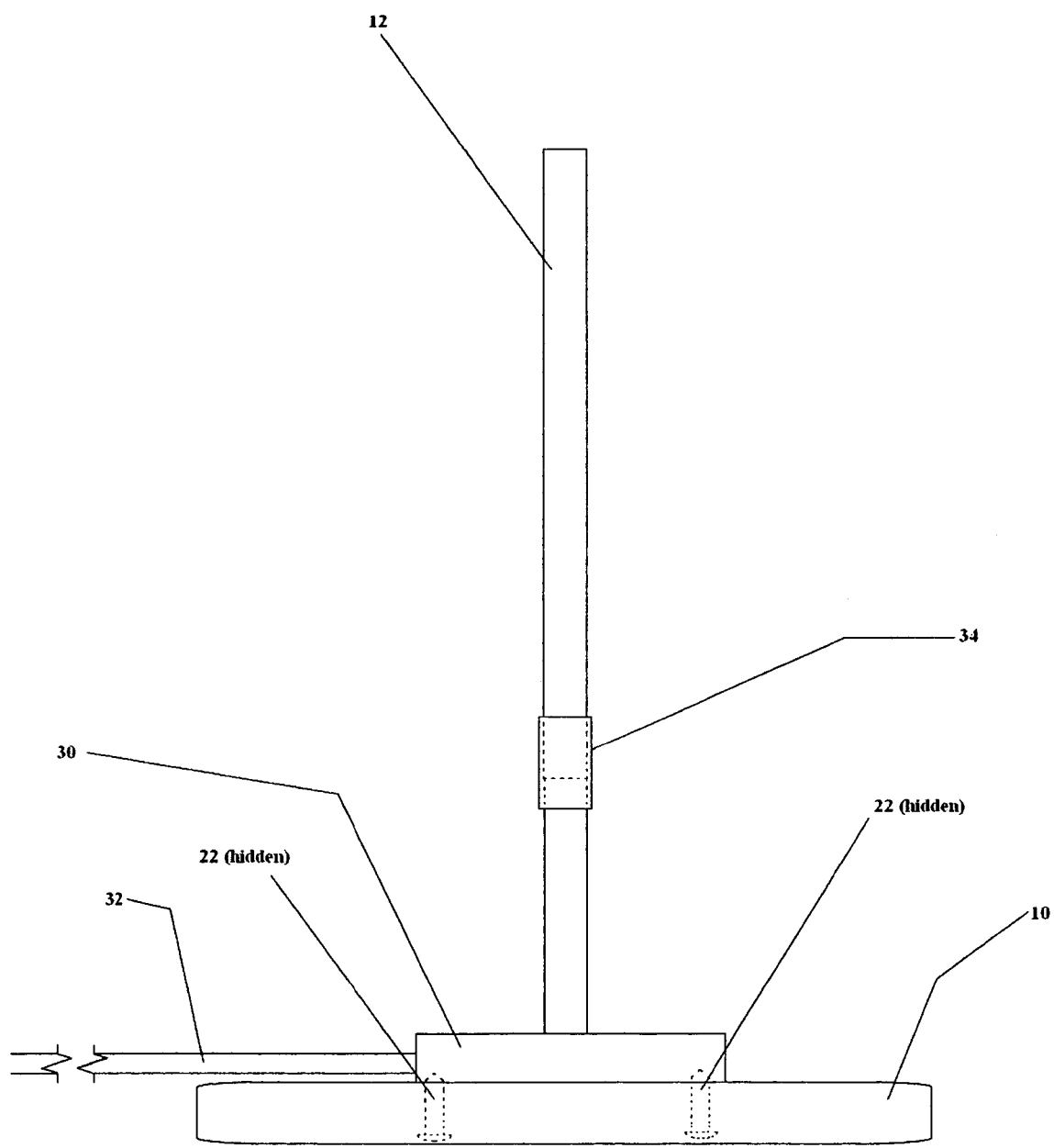
FIG. 5 represents a possible configuration in which the sensors were replaced by a "joystick" type device (defined as a manual control consisting of a vertical handle that can move freely, used as an input device to a computer. Here after referred to as 'joystick').

FIG. 5—Alternate Embodiments

FIG. 5 shows the same solid and stable base (10) as well as the same deflection cylinder (12) that was represented in the previous figures. However, the previous sensors (18(a)(b)) have been replaced by a joystick (30). The deflection cylinder (12) will be connected to the joystick by means of a simple coupling (34) that fastens the two parts ((12) and (30)) together. The joystick will be wired to the Small Computer (24) in the same fashion as the original sensors (18(*a*)(*b*)) this connection is shown as reference numeral (32). Despite the change, all functions, outputs, and results remain the same.

DETAILED DESCRIPTION OF ALTERNATE EMBODIMENTS

Also claimed are non-contact and tilt type deflection sensors. Typical of the non-contact types are infra-red or optical distance sensors. These embodiments include reflective surfaces on the deflection element (12) and multiple, typically orthogonally placed distance sensors. These sensors measure deflection on both x and y dimensions and transmit the information to a central processor. Said non-contact sensors would replace the original sensors (18(*a*)(*b*)). The infra-red type sensors would remain attached to the sensor platform (16). Sensors of the tilt style would be attached directly to the deflection element (12).

Tilt sensors can perform a similar function by measuring deflection in both the x and y dimensions and sending the information to a processor. Examples of these type sensor include semi-conductor MEMS (Micro Electronic Machined Semiconductors) devices, joysticks and linear potentiometers. In all cases the fundamental units of geometric deflection can be measured and reported to a processor for the determination of fluid speed and direction.

Operation—FIGS. 1–5—All Embodiments

In normal operation of this fluid flow direction and velocity sensor device:
 (1) The fluid (i.g. Air, water, etc.) impinges on the deflection cylinder (12), thus moving it.
 (2) Once the Deflection cylinder (12) has been moved by the impinging fluid, the sensor(s) (18(*a*)(*b*)) (except in the case of FIG. 5, in which sensors (18(*a*)(*b*) are replaced by joystick (30)) detect said movement and produce an output related to the movement of the deflection cylinder (12). This output from the sensor(s) (18 (*a*)(*b*)) (or (30)) could be in various electrical units.
 (3) Output of electrical units from sensor(s) (18(*a*)(*b*)) then goes to a small computer (24) which will then compute the wind speed and direction from the given number of given electrical units.
 (4) Once the wind speed and direction have been computed by the small computer (24), the wind speed and direction data is then sent to a personal computer (26) which displays the data graphically to the user.

CONCLUSION, RAMIFICATIONS, AND SCOPE

In conclusion, this invention has many advantages of previous fluid and gas sensors. They are simplicity, low cost and adaptability. Previous inventions address more sophisticated manifestations of the same basic instrument. None have addressed ease of manufacturability or adaptability in a form that this invention does.

The ramifications of this invention is to allow sophisticated measurements of fluid and gas motion to made with a relatively modest instrument. This will allow companies and institutions to use more instruments for less cost thereby enabling more precise data of the complete process of interest to be obtained.

The scope of this invention allows adaptations for many related sciences. Insofar as the invention is not limited to just fluid or just gases to be measured, a plethora of applications exist. Simple software modifications enable this allowing for updates to keep this invention useful for the foreseeable future.

Although the invention has been disclosed in terms of preferred embodiments, as well as a few possible alternates, it will be understood that numerous variations and modifications could be made thereto without departing from the spirit of this invention as defined in the following claims.

We claim:
1. A fluid flow direction and velocity sensor comprised of:
 A rigid base securely positioned in a substantially horizontal orientation; an elongated three dimensional component secured to said rigid base and extending substantially perpendicularly from said base with said three dimensional component being substantially freestanding and designed to be physically deflected when placed in a fluid flow stream, the amount of deflection being proportional to the velocity of any such fluid flow, and in the direction of any such fluid flow;
 A sensor platform spaced apart from said rigid base, said sensor platform defining an opening of greater dimension than said three dimensional component, and with said three dimensional component extending through said platform opening for deflection within said opening in response to any such fluid flow;
 At least two motion sensors carried by said platform, each said motion sensor being at an angle to at least one other said motion sensor, and each motion sensor having contact with said three dimensional component extending through said platform,each said sensor including means of detecting and measuring any deflection in said three dimensional component and each said sensor including means for transmitting any such measured deflection data; and
 Means for simultaneously receiving any such measured deflection data from at least two said motion sensors and to a system including means to compute the speed and direction of any fluid flow.

2. A fluid movement measuring apparatus comprised of;
 A rigid, three dimensional element having a length dimension, said three dimensional element being substantially freestanding and designed to be physically deflected in the direction of any fluid flow when placed in such a fluid flow stream, the amount of deflection being proportional and directional to the velocity and direction of any such fluid flow;
 Means for secured said rigid, three dimensional element substantially perpendicularly within any such fluid flow;
 Means for locating at least two motion sensors in proximity to said rigid, three dimensional element, each said motion being at a know angle to a least one other said motion sensor, and each motion sensor having contact with said rigid, three dimensional element, each said sensor including means for detecting and measuring the amount and direction of any deflection in said rigid, three dimensional element;
 Means for transmitting any such measured deflection data from each/at least two said sensors; and;
 Means for simultaneously receiving any such measured deflection data from at least two said motion sensors and including means to compute the speed and direction/fluid movement of any such fluid flow.

* * * * *